INVENTOR
S. C. HIGHT
BY Roy M. Porter Jr.
ATTORNEY

Dec. 29, 1964 S. C. HIGHT 3,163,820

SATELLITE COMMUNICATION SYSTEM EMPLOYING
A RETROGRADING ORBIT

Filed May 22, 1961 2 Sheets-Sheet 2

INVENTOR
S. C. HIGHT

BY Reg M. Porter, Jr.

ATTORNEY

United States Patent Office 3,163,820

Patented Dec. 29, 1964

3,163,820

SATELLITE COMMUNICATION SYSTEM EMPLOYING A RETROGRADING ORBIT

Stuart C. Hight, South Orange, N.J., assignor to Bell Telephone Laboratories, Incorporated, New York, N.Y., a corporation of New York Filed May 22, 1961, Ser. No. 111,703
12 Claims. (Cl. 325—4)

This invention relates to long distance radio communication systems and more particularly to an artificial earth satellite communication system in which one or more satellites have particularly defined and advantageous orbits.

A number of systems have been proposed for long distance communication utilizing one or more artificial satellites placed in orbits around the earth. Such a satellite may be of the passive reflector type in which signal energy is merely reflected between two ground stations within mutual visibility of the satellite, or of the active repeater type in which signal energy received from one station is amplified by equipment within the satellite and then re-transmitted to the other station, or of the courier type in which signals received from one station are recorded by equipment within the satellite and then re-transmitted at a later time toward the second station. All of these systems are limited by the length of time in which the satellite is visible from a given station or pair of stations, as the case may be. This means that in order to provide substantially continuous communication, or even to communicate for any significantly long period, a large plurality of satellites are required.

It is an object of the invention to increase the period during which a given communications satellite is visible from a given station or mutually visible from a plurality of stations.

In accordance with the present invention, it has been recognized that a high-altitude satellite, when launched in a particularly defined orbit at an angle to the earth's axis determined by the relative rotations of the earth and the satellite, will have a retrograde motion relative to the earth that causes the satellite to loop over a localized area or "hover" over this area for a period of time. When a satellite in such an orbit is operated in conjunction with one or more microwave radio stations located upon the surface of the earth within this localized area, communication over a sustained length of time may be maintained.

These and other objects and features, the nature of the present invention and its various advantages will appear more fully upon consideration of the specific illustrative embodiments shown in the accompanying drawings and described in detail in the following explanation of these drawings.

Figure 1:
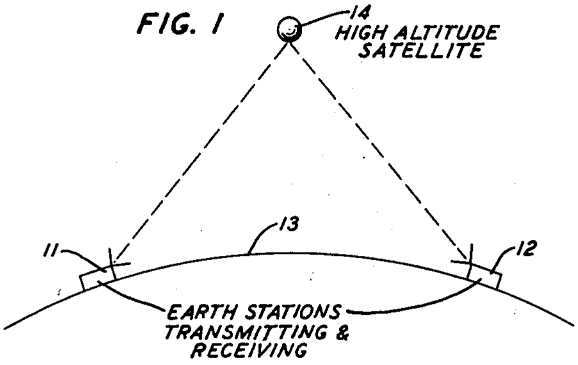
FIG. 1 is a schematic representation of a communication system employing a satellite in orbit above a portion of the earth's surface.

Referring more particularly to FIG. 1, a communications system of the general type contemplated by the invention is shown comprising earth stations 11 and 12 located on widely spaced portions of the earth's surface 13. Either station may include either a transmitter or a receiver, or each may include both a transmitter and a receiver to facilitate two-way communication. Located in a orbit to be defined hereinafter is a high-altitude satellite 14 which may be either a passive reflector, an active repeater or a courier type repeater in accordance with the foregoing definitions of these types of repeaters.

Figure 2:
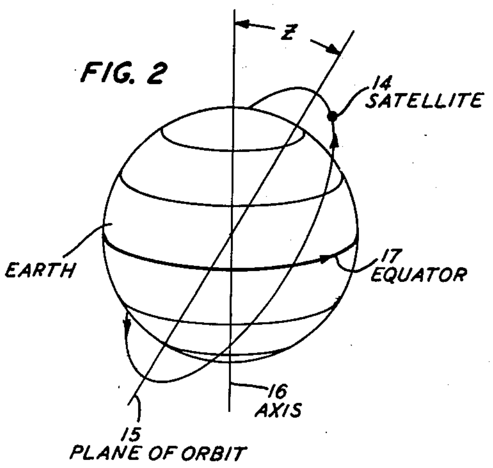
FIG. 2 is a schematic represenation of a satellite in an orbit inclined to the polar axis of the earth.

FIG. 2 shows more details of the orbit of satellite 14. The plane of the orbit, viewed in perspective, is represented by 15 which is inclined to the polar axis 16 of the earth by the angle $Z$ or by the angle $90-Z$ degrees to the equator 17. As the earth rotates about axis 16 in the period that is, of course, 24 hours, satellite 14 completes one circuit around orbit 15 in a period P. Hereinafter, the movement of the earth about its axis will be termed "rotating," while the movement of the satellite about its orbit will be termed "circuiting." In accordance with the invention, the radius of the orbit 15 is such that P is greater than 24 hours and the direction of circuiting along the orbit is such that the satellite has a rotational component about its orbital center in the same direction as the rotation of the earth. For the purpose of initially simplifying the explanation that follows, it will be assumed that the period P is an integral multiple of 24 hours, that is, 48, 72, 96, etc. However, as will be shown in detail hereinafter, the usefulness of the principles of the invention do not depend upon this relationship in every application.

The principles of the invention are concerned with heretofore unappreciated aspects of the relative east-west motion between portions of the earth's surface and the satellite in orbit over these portions due to the axial rotation of the earth and the orbital circuiting of the satellite. More particularly, when satellite 14 is over the equator, its east-west rotational component is small and, therefore, substantially less than the east-west component of the rotation of that portion of the earth. Ninety degrees later, when the satellite's position is near the northern or southern extremeties of its orbit, the satellite's east-west rotational component is maximum and if the earth latitude over which this extremity occurs is sufficiently great, as will be shown, the satellite's east-west rotational component exceeds that of the earth beneath it. When the satellite is at a position to be defined hereinafter between these extremes, the east-west component of rotation of the satellite is equal to the east-west component of rotation of the earth and the relative east-west movement between the two is zero.

Figure 3:
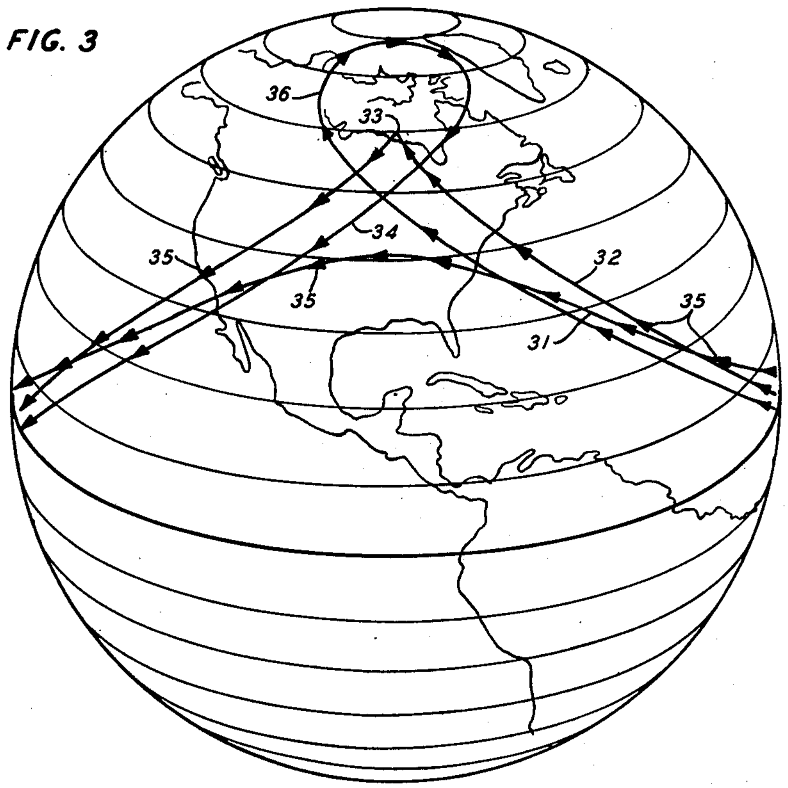
FIG. 3 shows traces upon the surface of the earth of a satellite in different orbits, including one having retrograde motion in accordance with the invention.

This relative motion, which is in fact the projected trace of the moving satellite upon the moving surface of the earth, is shown in FIG. 3. Thus, trace 31 on FIG. 3 illustrates the relative position of a satellite above the face of one portion of the earth when the inclination angle $Z_1$ of the satellite's orbit to the earth's axis is such that $$Z_1 > \sin^{-1}\frac{24}{P} \qquad (1)$$

Note that the east-west rotation of the earth is greater than that of the satellite during the entire orbit of the satellite and so the satellite appears to move continuously in a direction opposite to its actual motion.

If the inclination angle is decreased, however, such that $$Z_2 = \sin^{-1}\frac{24}{P} \qquad (2)$$

trace 32 of FIG. 3 represents the relative motion and shows that the trace of a satellite in this orbit will contain one peak in the northern hemisphere at latitude $90-Z_2$ degrees north and in the southern hemisphere at latitude $-90\ Z_2$ degrees south. At these peaks the east-west component of the circulating motion of the satellite relative to that of the rotating earth is essentially zero.

Finally, if the inclination angle is reduced further such that $$Z_3 < \sin^{-1}\frac{24}{P} \quad (3)$$

the path of the satellite over the face of the earth is represented by trace 34 which contains one loop 36 in each hemisphere. The epicenter of the loop is located at latitude 90 $-Z_2$ degrees and the relative east-west motion is essentially zero on either side of the loop at the epicenter latitude. The apparent direction reversal represented by the top portion of the loop 36 results from the satellite's east-west rotational component being greater than that of the earth beneath it so that the apparent motion of the satellite is in the same direction as its actual motion. The resulting loop is characteristic of a retrograde motion, that is, one in which the satellite appears to stop and then reverse its apparent direction of travel through the sky.

While Equations 1, 2 and 3 have been written in terms of the ratio of the 24-hour orbital period of the earth to the orbital period of P hours of the satellite, they could equally well have been written as the ratios of the angular speed of the earth of one revolution per day to the angular speed of $\omega$ revolutions per day of the satellite. In accordance with the invention, $\omega$ would be less than 1.

In order to illustrate a specific case, assume that the orbital period P is 48 hours. Therefore, trace 34 on FIG. 3 would represent an inclination angle Z of 10 degrees, trace 32 one of 30 degrees, and trace 31 one of 50 degrees. The arrows, such as 35, shown on each trace would be spaced 2 hours apart. Note that for the retrograde trace 34 satellite 14 stays within a reasonably localized area for approximately 12 hours then transits at high speed for 12 hours to an area directly opposite on the earth, hovers near there for 12 hours, and then returns. In a courier type system this feature would facilitate communication between the United Kingdom and New Zealand or between Australia and North America, to mention two specific examples.

The hovering quality of a satellite in retrograde motion makes it particularly useful as a communication repeater either active or passive. Note, for example, that under the specific conditions assumed in FIG. 3, a single satellite may be used continuously over one area for 12 hours. Furthermore, since the line of sight coverage of such a satellite is so great, actually 179 degrees, the line of sight includes substantially an entire hemisphere of the earth.

Figure 4:
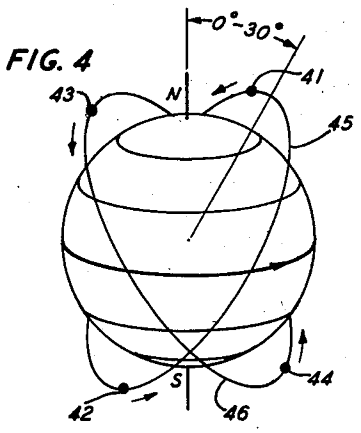
FIG. 4 is a schematic showing of how a plurality of satellites in accordance with the invention should be deployed.

A particular feature of the invention resides in the manner in which four such satellites should be deployed to give continuous service. Referring to FIG. 4, it may be seen that two 48 hour satellites, 41 and 42, are launched 24 hours apart in one orbit 45 inclined to the earth's axis by an angle Z that is greater than zero degrees and less than 30 degrees so as to produce retrograde motion with an epicenter in the vicinity of latitude 60 degrees. A second pair of satellites 43 and 44, bearing corresponding time relationships to satellites 41 and 42, respectively, are launched in a similarly inclined orbit 46 on the other side of the pole. Orbits 45 and 46 are, therefore, inclined to each other by twice the angle of either to the pole. Thus, one satellite will be in retrograde loop over each quarter of the earth during each 12 hour period.

The preceding discussion has assumed, for simplicity, that the orbital period P of the satellites discussed was an integral ratio of the 24 hour rotational period of the earth. Such an orbit is designated as one that is earth synchronous. In this case the trace of the satellite over the face of the earth will repeatedly follow precisely the same track once on each full excursion of the satellite. If the relationship is not precise, then the track will drift slightly so that successive tracks will be similar but slightly removed from each other.

Earth synchronism, while desirable for many applications, is not essential to enjoy most of the benefits of a communications satellite in an orbit producing a retrograde loop. Thus, an orbital period P greater than 24 hours but different from a 24 hour multiple will produce the characteristic retrograde loops north and south of the equator for each full period P but with an angular separation $d$ between the loops around the earth of $$d = 360\left(\frac{P}{24} - 1\right) \quad (4)$$

Of course, if $d$ is an integral fraction of 360 degrees the tracks will repeat exactly each full pattern.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A communication system comprising an artificial satellite circuiting about the earth in the same direction as the rotation of the earth with a rotational period that is greater than the rotational period of the earth, said satellite having an orbit inclined to the axis of the earth by an angle that is small enough so that said orbit carries said satellite over respectively successive portions of the earth that have east-west rotational components that are less than, equal to and more than the east-west rotational component of said satellite over that portion of the earth so that the trace of said satellite upon and relative to the surface of the earth produces a retrograde loop about that portion of the earth's surface having said equal rotational component, and at least one microwave radio station located upon the earth's surface within radio visibility of that portion having said equal rotational component for communication with said satellite.

2. A long distance communications system comprising an artificial earth satellite circuiting about the earth and at least one microwave radio station located upon the surface of the earth for communication with and by way of said satellite, said satellite circuiting in the same direction as the rotation of earth at an angular speed that is less than the angular speed of the earth and in an orbit, the plane of which is inclined to the axis of the earth by less than the angle whose sine is the ratio of said angular speeds.

3. The system according to claim 2 including two satellites circuiting in substantially a first orbit inclined by said angle on one side of said axis and two additional satellites circuiting substantially in a second orbit inclined by substantially twice said angle to said first orbit.

4. A long distance communications system comprising a communications satellite circuiting about the earth in the same direction as the rotation of the earth with an orbital period P that is greater than 24 hours and in an orbit the plane of which is inclined to the axis of the earth by an angle that is less than $$\text{sine}^{-1}\frac{24}{P}$$

means located upon the earth for transmitting an intelligence bearing signal toward said satellite, and means located upon the earth for receiving an intelligence bearing signal from said satellite.

5. The system according to claim 4 in which said orbital period P is a multiple of 24 hours.

6. The system according to claim 4 in which said orbital period P is 48 hours and in which said inclination angle is between 0 and 30 degrees.

7. A method of communicating over a long distance path which comprises the steps of placing an artificial communication satellite into an orbit wherein said satellite circuits about the earth in the same direction as the rotation of the earth with a rotational period that is greater than the rotational period of the earth, the plane of said orbit being inclined to the axis of the earth by an angle that is small enough so that said orbit carries said satellite over respectively successive portions of the earth that have east-west rotational components that are less than, equal to, and more than the east-west rotational component of said satellite over that portion of the earth so that the trace of said satellite upon and relative to the surface of the earth produces a retrograde loop about that portion of the earth's surface having said equal rotational component, and communicating with said satellite from at least one microwave radio station located upon the earth's surface within radio visibility of that portion having said equal rotational component.

8. A method of communicating over a long distance path which comprises the steps of placing an artificial earth satellite into an orbit wherein said satellite circuits about the earth in the same direction as the rotation of the earth at an angular speed that is less than the angular speed of the earth, the plane of said orbit being inclined to the axis of the earth by an angle less than the arcsine of the ratio of said angular speeds, and communicating with said satellite from at least one ground station located upon the surface of the earth.

9. A method according to claim 8 which includes placing two satellites in substantially a first orbit inclined by said angle on one side of said axis and placing two additional satellites in substantially a second orbit inclined by substantially twice said angle to said first orbit.

10. A method for communicating between two points on the earth's surface separated by a long distance which comprises, in combination, placing a communications satellite into an orbit wherein said satellite circuits about the earth in the same direction as the rotation of the earth with an orbital period P that is greater than 24 hours, the plane of said orbit being inclined to the axis of the earth by an angle that is less than $$\text{sine}^{-1}\frac{24}{P}$$

transmitting an intelligence bearing signal toward said satellite, and receiving an intelligence bearing signal from said satellite.

11. A method according to claim 10 in which said orbital period P is an integral multiple ratio of 24 hours.

12. A method according to claim 9 in which said orbital period P is 48 hours and in which said inclination angle is between 0 and 30 degrees.

References Cited in the file of this patent

Bartow et al.: "Design Considerations for Space Communication," I.R.E. Trans. On Communications Systems, vol. CS-7, No. 4, December 1959, pages 232–240.